United States Patent [19]

Lethellier

[11] Patent Number: 4,760,276
[45] Date of Patent: Jul. 26, 1988

[54] POWER SUPPLY SYSTEM, FOR SEGMENTED LOADS, HAVING PHANTOM REDUNDANCY

[75] Inventor: Patrice R. A. Lethellier, Los Angeles, Calif.

[73] Assignee: Unisys Corporation, Detroit, Mich.

[21] Appl. No.: 117,981

[22] Filed: Nov. 9, 1987

[51] Int. Cl.$^4$ .............................................. H02J 3/00
[52] U.S. Cl. ..................................... 307/18; 307/19; 307/42; 307/38; 307/64; 307/66
[58] Field of Search ................................... 307/18–87, 307/17; 363/65, 70, 71; 323/268

[56] References Cited

U.S. PATENT DOCUMENTS

| | | | |
|---|---|---|---|
| 2,957,993 | 10/1960 | Sichling | 307/31 X |
| 3,289,006 | 11/1966 | Wilhelm et al. | 307/24 |
| 3,334,241 | 8/1967 | Ussery | 307/24 |
| 3,665,203 | 5/1972 | Barnett et al. | 307/57 X |
| 3,894,244 | 7/1975 | Hill | 307/84 X |
| 3,912,940 | 10/1975 | Vince | 307/64 |
| 4,425,613 | 1/1984 | Shelby | 363/71 X |
| 4,659,942 | 4/1987 | Volp | 307/19 |
| 4,670,661 | 6/1987 | Ishikawa | 307/43 X |
| 4,698,738 | 10/1987 | Miller et al. | 323/268 X |

Primary Examiner—William M. Shoop, Jr.
Assistant Examiner—Paul Ip
Attorney, Agent, or Firm—Charles J. Fassbender; L. Joseph Marhoefer

[57] ABSTRACT

A power supply system for segmented loads, and having phantom redundancy, is comprised of multiple sets of power supplies, with each set having an output terminal for furnishing load current at a certain voltage. A respective load is connected to the output terminal of each set, and each set also has a current-sharing circuit by which the load currents furnished from the supplies within a set are equalized. Further, all of the supplies from all the loads combined, minus any one supply, have a total current-furnishing capacity which meets the current requirements of all of the loads, but no set of supplies for any one load includes an extra or redundant supply. Also, switches are provided which selectively interconnect, and disconnect, the respecitve current-sharing circuits of the power supply sets such that the supplies of all connected sets furnish equalized load currents. In addition, variable resistors are provided which selectively interconnect the respective output terminals of the power supply sets through a conductance that increases from zero by a predetermined small step and thereafter progressively increases to a short circuit, and which selectively disconnects the respective output terminals though an oppositely varying conductance.

15 Claims, 4 Drawing Sheets $t = t_5$
$R_{20a} \to \infty$ ~eq.26
$I_4 = 0 \, (\Delta I_4 = 5)$ ~eq.27
$I_1 = 550 \div 2 = 275$ ~eq.28
$I_2 = I_3 = \dfrac{(450 - 1400)}{4} = 462.5$ ~eq.29
*Fig. 4B*
*Fig. 4*
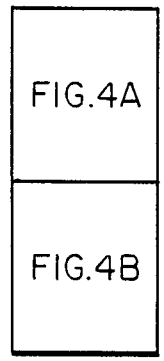
*Fig. 5*
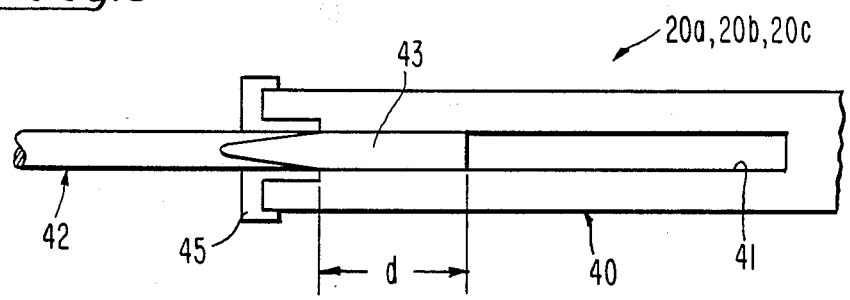

Fig. 4A $t = t_0$ $I_1 = +400 \sim \dfrac{550+450+1400}{6} \sim eq.1$ $I_2 = I_1 \sim eq.2$ $I_3 = I_1 \sim eq.3$ $I_4 = +250 \sim 400 \times 2 - 550 \sim eq.4$ $t = t_1$ $V_1 < V_2 \& V_3 \sim eq.5$ $\therefore PS_2 \& PS_3$ try to supply all $I \sim eq.6$ $(550+450+1400) \div 4 = 600 \sim eq.7$ $600 > 500 \sim eq.8$ $I_2 = I_3 = 500 \sim eq.9$ $I_4 = -150 \sim (500)(4) - 450 - 1400 \sim eq.10$ $I_1 = (500-150) \div 2 = 200 \sim eq.11$ $t = t_2$ $R20a \rightarrow 50\mu\Omega \sim eq.12$ $V20a$ increases to $(150)(50\mu\Omega) = 7.5 mV \sim eq.13$ $2\Delta Vmax = 20 mV \sim eq.14$ $\therefore 7.5 mV$ is ok $\sim eq.15$ $t = t_3$ $R20a \rightarrow 200\mu\Omega \sim eq.16$ $V20a - (150)(200\mu\Omega) = 30 mV \sim eq.17$ $2\Delta Vmax = 20 mV \sim eq.18$ $\therefore I_4 = (20mV) \div (200\mu\Omega) = -100 \sim eq.19$ $I_1 = (550-100) \div 2 = 225 \sim eq.20$ $I_2 = I_3 = \dfrac{(450+1400+100)}{4} = 487.5 \sim eq.21$ $t = t_4$ $R20a \rightarrow 4000\mu\Omega \sim eq.22$ $I_4 = (20mV) \div (4000\mu\Omega) = -5 \sim eq.23$ $I_1 = (500-5) \div 2 = 272.5 \sim eq.24$ $I_2 = I_3 = \dfrac{(450+1400+5)}{4} = 463.75 \sim eq.25$

POWER SUPPLY SYSTEM, FOR SEGMENTED LOADS, HAVING PHANTOM REDUNDANCY

BACKGROUND OF THE INVENTION

This invention relates to power supply systems which furnish DC current at a certain voltage to electrical loads; and more particularly, it relates to such power supply systems in which the loads are segmented and the power supply system has redundancy.

Typical electrical loads for such power supplies are integrated circuits. They are usually packaged on printed circuit boards which have power and ground pins as well as multiple input/output pins for receiving and sending signals. Hundreds of these boards are often included in a single electronic system, such as a large data processing system or a large communications system. Multiple backplanes are commonly provided to hold the boards in groups of 10 to 20 and send signals between them, and each backplane has its own power and ground buses.

One way to provide power to such a multiple backplane system is to cable the power buses of all the backplanes together, and to connect them to a set of power supplies which operate in parallel to share in furnishing the total load current. Also, a redundant supply (i.e., an extra supply) can be included in such a system so that if any one power supply fails, the electronic system can still operate. This type of power supply system, including a redundant supply, is described in U.S. Pat. No. 4,698,738 by J. Miller and J. Walker which is assigned to the present assignee.

However, in a multiple backplane electronic system, it is often desirable to have the backplanes and their supplies segmented (electrically isolated) from each other. Such segmenting enables the supplies for just one backplane to be turned off while the supplies and the circuitry of the remaining backplanes continue to operate. For example, large data processing systems often contain multiple digital computers, each of which is housed on a different backplane. When the circuitry in one of those computers fails or needs to be upgraded, it is desirable to be able to power down just the backplane of that one computer so that the repair or upgrade can be made while at the same time, the remaining computers continue to operate. However, with the above referenced power supply system, this cannot be done because there, power cannot be independently applied to and removed from the individual backplanes.

One way to solve the above problem is to not connect the power buses of the backplanes together, and to provide a separate set of power supplies (such as those of the referenced power supply system) for each backplane. But in that case, a separate redundant supply would also have to be provided for each backplane; and that would substantially increase the cost of the system. For example, consider an electronic system of FIG. 1 which has three loads $L_1$, $L_2$, and $L_3$. Suppose further that load $L_1$ requires two power supplies 1A and 1B to furnish its load current; load $L_2$ requires just one power supply 2A to furnish its load current; and load $L_3$ requires three power supplies 3A, 3B, and 3C to furnish its load current. In that case, a total of six power supplies are required to furnish the needed load current, but an additional three redundant supplies R (one for each load) are also required to provide redundancy. Thus, redundancy increases the cost of the system by 50%.

Accordingly, it is a primary object of the invention to provide a power supply system in which all of the above problems are avoided.

BRIEF SUMMARY OF THE INVENTION

In accordance with the invention, a power supply system is comprised of: multiple sets of power supplies; each set having an output terminal for furnishing load current at a certain voltage; a respective load connected to the output terminal of each set; and each set further having a current-sharing circuit by which the load currents furnished from the supplies within a set are equalized. Further, all of the supplies for all the loads combined, minus any one supply, have a total current-furnishing capacity which meets the current requirements of all of the loads, but no set of supplies for any one load includes an extra or redundant supply. Also, switches are provided which selectively interconnect, and disconnect, the respective current-sharing circuits of the power supply sets such that the supplies of all connected sets furnish equalized load currents. In addition, variable resistors are provided which selectively interconnect the respective output terminals of the power supply sets through a conductance that increases from zero by a predetermined small step and thereafter progressively increases to a short circuit, and which selectively disconnects the respective output terminals through an oppositely varying conductance. With this power supply system, any one load can be disconnected from the others while all the supplies are operating; then the disconnected load can be repaired/upgraded; and then all the loads can be reconnected again while the supplies are operating. Also, if any one supply fails, all of the loads can keep running.

BRIEF DESCRIPTION OF THE DRAWINGS

Various features and advantages of the invention are described herein in detail in conjunction with the accompanying drawings wherein:

FIGS. 4, 4A and 4B are set of equations which explain the time sequence by which the FIG. 3 system operates;

FIG. 5 shows a preferred physical makeup for some of the components in the system of FIGS. 2 and 3;

DETAILED DESCRIPTION OF THE INVENTION

Figure 2:
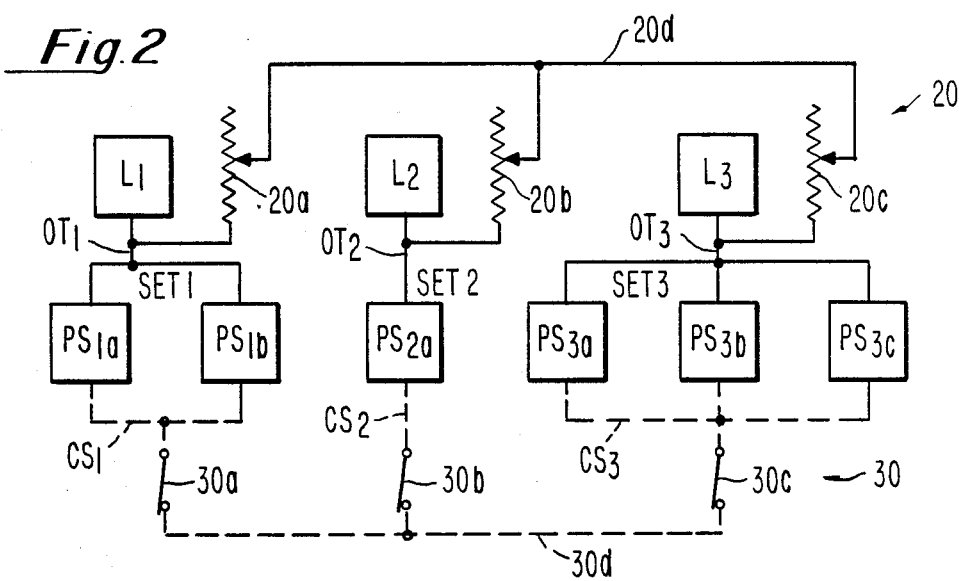
FIG. 2 shows a preferred embodiment of a power supply system which is constructed according to the invention.

Referring now to FIG. 2, one preferred embodiment of a power supply system which is constructed in accordance with the invention will be described in detail. This power supply system includes three sets of power supplies which are hereinafter referred to as SET1, SET2, and SET3. In SET1 there are two power supplies $PS_{1a}$ and $PS_{1b}$; in SET2 there is one power supply $PS_{2a}$; and in SET3 there are three power supplies $PS_{3a}$, $PS_{3b}$, and $PS_{3c}$.

Each set of power supplies has an output terminal which furnishes load current at a predetermined voltage. In FIG. 2, the output terminal of the SET1 power supplies is indicated as $OT_1$; the output terminal of the SET2 power supply is indicated as $OT_2$; and the output terminal of the SET3 power supplies is indicated as $OT_3$. A load $L_1$ is connected directly to output terminal $OT_1$; a load $L_2$ is connected directly to output terminal $OT_2$; and a load $L_3$ is connected directly to output terminal $OT_3$.

Figure 1:
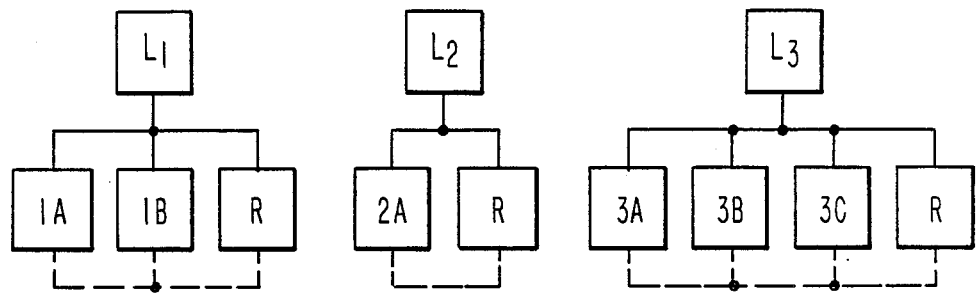
FIG. 1 shows a prior art power supply system which has segmented loads and redundancy.

Each set of power supplies further includes a current-sharing circuit which operates to equalize the load current that each power supply in a set furnishes to its respective output terminal. In FIG. 1, the current-sharing circuit for the SET1 power supplies is schematically indicated by a dashed line $CS_1$; the current-sharing circuit for the SET2 power supply is indicated by a dashed line $CS_2$; and the current-sharing circuit for the SET3 power supply is indicated by a dashed line $CS_3$. All of the details of one suitable current-sharing circuit are given in U.S. Pat. No. 4,698,738; and they are herein incorporated by reference.

Now in accordance with the invention, a connector 20 is provided which selectively connects and disconnects the output terminals $OT_1$, $OT_2$, and $OT_3$ of the power supply sets as they are running. In FIG. 2, connector 20 is illustrated as being comprised of three variable resistors 20a, 20b, and 20c which respectively connect output terminals $OT_1$, $OT_2$, and $OT_3$ to a node 20d. Each of these resistors has a conductance that increases from zero by a predetermined small step and thereafter progressively increases to a highly conductive value.

Also in accordance with the invention, a switch 30 is provided which selectively interconnects, and disconnects, the respective current-sharing circuits of each of the power supply sets. In FIG. 2, switch 30 is shown as consisting of three single pole single throw switches 30a, 30b, and 30c which respectively interconnect the current-sharing circuits $CS_1$, $CS_2$, and $CS_3$ to a node 30d. When the current-sharing circuits of any two power supply sets are connected via switch 30, and the output terminals of those same two sets are connected via connector 20 through a high conductance, then the supplies of both sets equalize their output currents.

Figure 3:
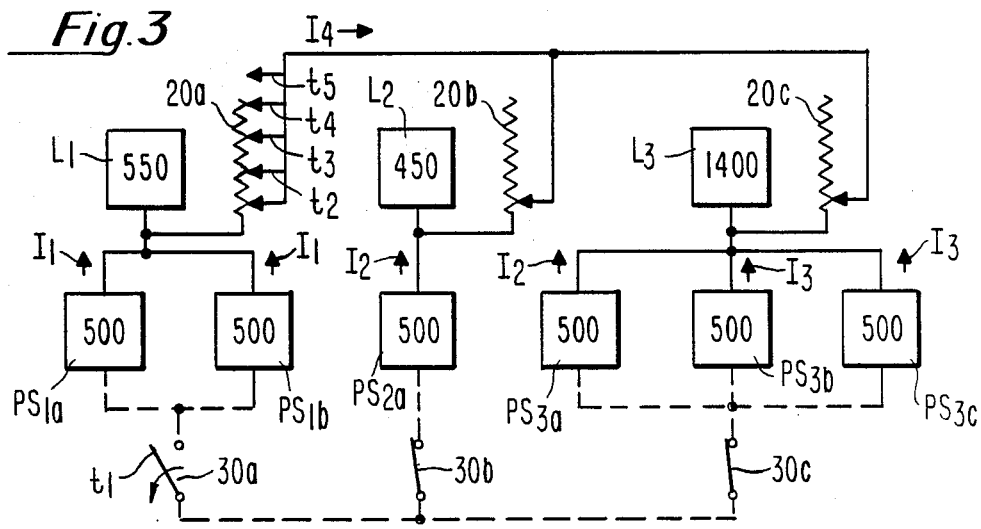
FIG. 3 is a more specific version of the FIG. 2 embodiment in which the current requirements for the loads and the current-furnishing capacities for the supplies are all specified.

Further in accordance with the invention, the total number of power supplies is selected such that all of the supplies together, minus any one supply, have a total current-furnishing capacity which meets the current requirements of all of the loads; and at the same time, no set of supplies is made so large as to include a redundant supply. One particular example of this is shown in FIG. 3. There, the loads $L_1$, $L_2$, and $L_3$ are respectively shown as requiring 550 amps, 450 amps, and 1400 amps; the SET1 power supplies have a capacity of 500+500 amps; the SET2 supply has a capacity of 500 amps; and the SET3 supplies have a capacity of 500+500+500 amps.

Now, to understand how the power supply system of FIG. 3 operates, reference should be made to FIG. 4 wherein the state of that power supply system is shown at various time instants $t_0$ through $t_5$. Initially, beginning at time $t_0$, all of the variable resistances 20a–20c are in their most conductive position, and all of the current-sharing switches 30a–30c are closed. Suitably, the resistance of each variable resistance at this time is less than 20 micro ohms.

Due to the above switch and resistance positions, the power supplies in all of the sets furnish equal amounts of load current. In the specific example of FIG. 3, current $I_1$ from each of the SET1 supplies equals 400 amps as given by equation 1. Current $I_2$ from the SET2 supply and $I_3$ from each of the SET3 supplies equals current $I_1$ as is given by equations 2 and 3. Switch 20a carries a current $I_4$ which is +250 amps as is given by equation 4.

Suppose now that the FIG. 3 system continues to operate in the above state until some sort of fault occurs in load $L_1$ or a feature needs to be added to $L_1$. Then the need arises to remove power from load $L_1$ so that the problem can be worked on. To that end, at time $t_1$, switch 30a is opened thereby stopping any current-sharing between the power supplies of SET1 and the power supplies of SET2 and SET3. As a result, the current furnished by the supplies of SET1 will stop tracking the current of the other supply sets, and a small voltage difference will occur between the output terminal of SET1 and the other supply sets.

Assume now that the voltage on output terminal $OT_1$ is slightly less than the voltage on output terminals $OT_2$ and $OT_3$. This is stated by equation 5. Due to the slight voltage imbalance, the SET2 and SET3 power supplies will try to furnish all of the current to all of the loads $L_1$, $L_2$, and $L_3$. This is stated by equation 6. However, the power supplies of SET2 and SET3 do not have enough current-furnishing capacity to furnish all of the load current. This is shown by equations 7 and 8.

Equation 7 shows that the four supplies of SET2 and SET3 each need to furnish 600 amps in order to supply all of the load current; and equation 8 says that each supply can only furnish 500 amps. Thus, currents $I_2$ and $I_3$ will be limited to 500 amps as is given by equation 9; and the excess of that current over the requirements of loads $L_2$ and $L_3$ will equal the current $I_4$ through switch 20a. Thus, current $I_4$, as is stated by equation 10, becomes −150 amps. Load $L_1$ requires 550 amps; the difference between that amount and the 150 amps through switch 20a is furnished by the SET1 power supplies; and so the supplies $PS_{1a}$ and $PS_{1b}$ each furnish 200 amps.

Next, at time $t_2$, the resistance of the variable resistor 20a is slightly increased from its minimum value. For example, as stated by equation 12, the resistance increases to 50 micro ohms. Thus, if the current $I_4$ through resistor 20a remains unchanged, the voltage across resistor 20a will rise to 7.5 millivolts. Any rise in voltage across resistor 20a has, however, an important constraint. Specifically, the voltage across resistor 20a cannot exceed the tolerances with which the voltages can vary between the output terminals of any two power supplies.

Constant voltage power supplies have a tolerance of $\pm \Delta V$ on their output terminal voltage which is caused by the accuracy with which the constant voltage can be preset. For low voltage supplies (i.e., zero to ten volts), that voltage tolerance $\Delta V$ of any one supply typically will be $\pm 10$ millivolts. Thus the maximum voltage difference between any two supplies is $2 \Delta V$ which occurs when one supply voltage is preset at nominal minus $\Delta V$ and the other supply voltage is preset at nominal plus $\Delta V$. Typically, $2 \Delta V$ has a maximum of 20 millivolts, and this is stated by equation 14. Since the 7.5 millivolt drop across resistor 20a is less than this largest preset voltage difference between the output terminals of two supplies, the state of the system as shown at time $t_2$ is stable and can occur.

Next, at time instant $t_3$, the resistance of resistor $20a$ is increased further to 200 micro ohms. This is stated by equation 16. Thus, if the 150 amps continues to flow through resistor $20a$, the voltage drop across resistor $20a$ will be 30 millivolts. This is stated by equation 17. But such a 30 millivolts drop cannot occur because it is greater than the maximum tolerance that is possible between the output terminal voltage of any two supplies. Consequently, the drop across resistor $20a$ will be limited to that maximum or 20 millivolts. This is stated by equation 18.

Now, given a 20 millivolt maximum drop across resistor $20a$ while its resistance is 200 micro ohms, then the current $I_4$ must equal $-100$ amps. This is stated by equation 19, and it is less than the $-150$ amps that occur at times $t_0$, $t_1$, and $t_2$. Consequently, the power supplies of SET1 will increase the amount of current which they furnish to load $L_1$ as is shown by equation 20; and the power supplies of sets 2 and 3 will decrease the amount of current which they furnish as is shown by equation 21.

Next, at time $t_4$, the resistance of resistor $20a$ is further increased to 4000 micro ohms. This is stated by equation 22. As a result, the current $I_4$ drops even further to just 5 amps as is stated by equation 23. Thus the load current from the supplies of SET1 increase further as is given by equation 24; and the current from the supplies of SET2 and SET3 decrease further as is given by equation 25.

Finally, at time $t_5$, the variable resistor $20a$ open circuits, and so its conductance goes to zero. This is stated by equation 26. As a result, current $I_4$ goes from 5 amps to zero. This change in current which occurs when the resistance $20a$ is opened is, however, very small. Thus no hazardous sparking occurs, no data damaging RFI radiation occurs, and no data damaging sag or spike in output terminal voltage occurs. This is stated by equation 27.

Once resistor $20a$ is opened, the power supplies of SET1 furnish all of the current to load $L_1$; and the power supplies of SET2 and SET3 furnish all of the current to loads $L_2$ and $L_3$. This is stated by equations 28 and 29. In other words, load $L_1$ and the power supplies of SET1 have been isolated from the rest of the system.

At this point, the power supplies of SET1 can be turned off so that load $L_1$ can be worked on (i.e., a problem repaired or a feature added). And at the same time, the loads $L_2$ and $L_3$ can continue to operate. Allowing loads $L_2$ and $L_3$ to operate in this fashion is a very important feature since, for example, it can bring in thousands of dollars of extra billings in the case where each load is a computer in a multiprocessor data processing system.

After the work on load $L_1$ is complete, the system is reconnected by performing all of the above described operations in reverse order. Thus, the initial state of the system will be as given at time $t_5$; the next state of the system will be as is given at time $t_4$; etc. And, during the reconnection sequence, no hazardous sparking occurs, no data damaging RFI occurs, and no data damaging sag or spike in output terminal voltage occurs since the step in conductance is small and thus the step in load current is small.

Turning now to FIG. 5, a preferred embodiment of each of the variable resistors $20a$, $20b$, and $20c$ will be described. This embodiment includes one member 40 which has an elongated passageway 41; and it includes another member 42 which is shaped to slide into the passageway 41 and engage the passageway surfaces. Preferably there is some elasticity between the members 40 and 42 as they engage so they make intimate contact but do not wear out. Symbol "d" in FIG. 5 indicates the distance by which member 42 is inserted into the passageway 41; and the conductance between the members 40 and 42 increases as the distance "d" increases.

As was previously explained, it is critical that the step in conductance between the members 40 and 42 is very small as those members initially engage. In the FIG. 5 embodiment, this small step is achieved by providing a beveled tip 43 on member 42. By beveling the tip 43, the surface area between the members 40 and 42 at their point of initial engagement can be made as small as desired, and thus the initial conductance between those members is reduced by a like amount.

Figure 6:
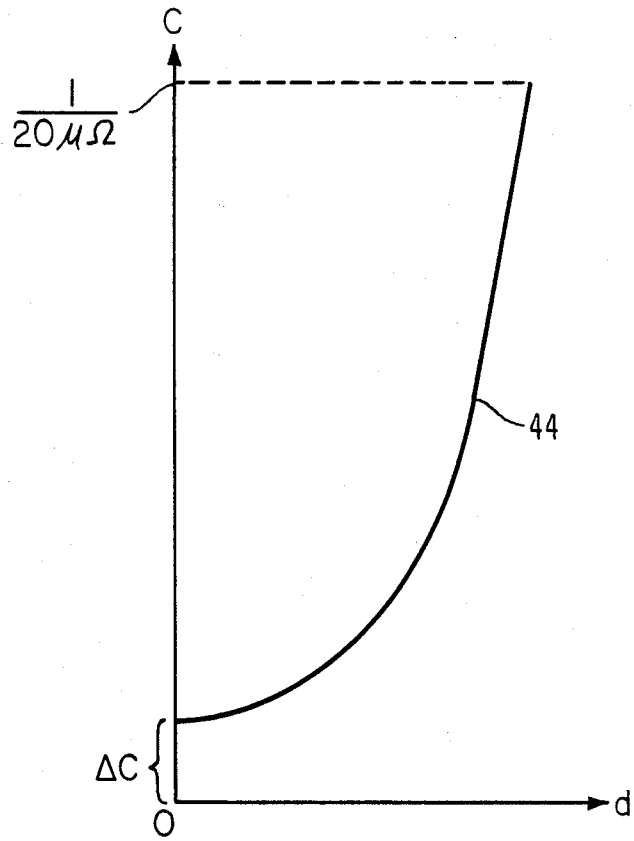
FIG. 6 illustrates the operation of the FIG. 5 component.

Conductance between the members 40 and 42 increases in a nonlinear fashion until all of the tip 43 is in the passageway 41. Thereafter, the conductance between the members 40 and 42 rapidly increases in a linear fashion with the distance "d". All of this is shown in FIG. 6 by a curve 44.

Preferably, the entrance to the passageway 41 is covered with an insulator 45. This insulator 45 prevents the end of the tip 43 from being accidentally pushed flush against that portion of member 40 which the insulator 45 covers. Such accidental contact must be prevented since it would produce a large step in conductance between the members 40 and 42. Also, the insulator 45 within the passageway serves as a guide which prevents "contact bounce" from occurring between the members 40 and 42 as they initially engage.

Figure 7:
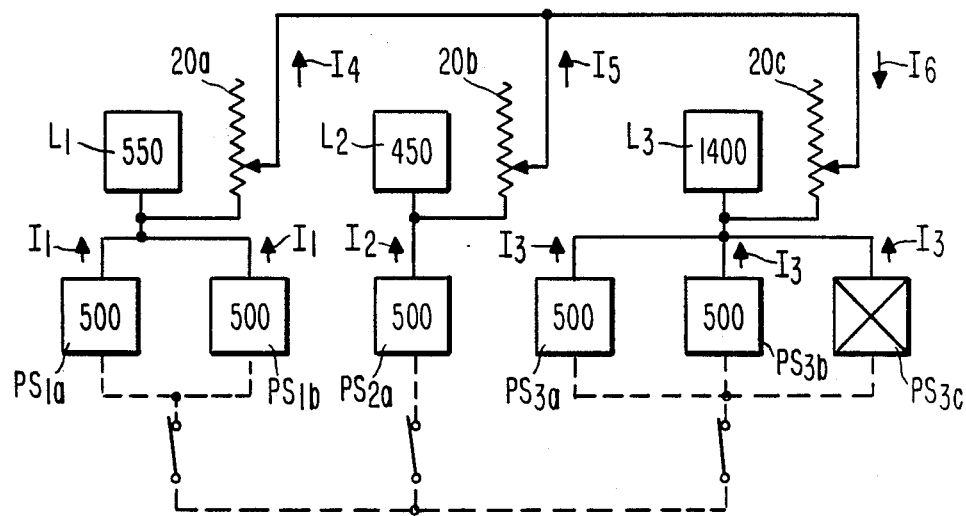
FIG. 7 shows the operation of the FIG. 3 system under the conditions where one power supply fails.

Consider now the sequence which occurs when any one of the power supplies fails. This situation is illustrated in FIG. 7 wherein power supply $PS_{3c}$ is shown to have failed. When a supply fails, it automatically turns itself off and acts like an open circuit. Current to the loads $L_1$, $L_2$, and $L_3$ is then furnished by all of the remaining power supplies which are still operating.

For the system which is illustrated in FIG. 7, each of the remaining power supplies will furnish 480 amps after supply $PS_{3a}$ fails. This is calculated as $550+450+1400$ divided by 5. Current $I_4$ will equal $480 \times 2 - 50$; current $I_5$ will equal $480 - 450$; and current $I_6$ will be the sum of current $I_4$ and current $I_5$.

One primary feature of the above system is that in the event of a power supply failure, all of the loads will continue to operate even though no one load has an extra or redundant supply. This is very important because the alternative of adding an extra or redundant supply in each set would significantly increase the system's cost and thereby make it less competitive. Further, the addition of an extra supply in each set would decrease the system's MTBF (mean time between failure) simply because there would be more parts that might fail.

To replace the failed power supply $PS_{3c}$, a repairman merely needs to pull that supply out of a socket which attaches it to the output terminal and current-sharing circuit, and to insert a new supply. When that occurs, the power supply system will then revert back to the state which it had before supply $PS_{3a}$ failed (i.e., the state which is described at time $t_0$ in FIG. 4).

A preferred embodiment of the invention has now been described in detail. In addition, however, many changes and modifications can be made to these details without departing from the nature and spirit of the invention.

For example, in the embodiment of FIG. 3, the power supplies of all of the sets have the same current-furnishing capacity. But as an alternative, the current-furnishing capacity of the supplies can vary from set to set and they can also vary within a set.

To illustrate this point, suppose that load $L_3$ in FIG. 3 only requires 1100 amps. Then, power supply $PS_{3c}$ can be changed to have a current-carrying capacity of only 200 amps. When all of the loads and all of the supplies are operating, each supply will share in furnishing load current in proportion to its current-furnishing capacity. And when any one power supply fails, the remaining power supplies will likewise share in picking up the added load.

As another alternative, the physical makeup of the variable resistors $20a$, $20b$, and $20c$ can be modified from that which is shown in FIG. 5; however, it is critical that the initial step in conductance from zero remains small. For example, instead of having a beveled tip 43 on member 42, just a small narrow portion of the surface of passageway 41 can be made conductive at the passageway entrance; and that conductive portion can then be made progressively wider with the distance "d".

Some latitude is allowable on the maximum size of the step in conductance which occurs in the variable resistors $20a$, $20b$, and $20c$. However, as the size of the step increases, a corresponding step in loaariable resistors $20a$, $20b$, and $20c$. However, as the size of the step increases, a corresponding step in load current also occurs in each of the power supply sets; and that in turn causes a voltage sag or spike to occur at the loads. Eventually, a point is reached at which the step in current is so large that the resulting sag or spike in voltage causes the circuitry in a load to operate improperly.

So, to avoid this problem, the product $2\Delta V \Delta C$ preferably is limited to that which causes a voltage sag or spike at the loads which is less than 3% of the nominal supply voltage. Alternatively, the product $2\Delta V \Delta C$ is limited to be less than 20% of the respective current-furnishing capacity of each power supply set. Here as before, $\pm \Delta V$ is the permissible preset tolerance of the output voltage. In many cases, these constraints can be met by limiting $\Delta C$ to be less than one thousand mhos (i.e.,—limiting $1/\Delta C$ to be more than 1000 micro ohms).

Note that, as was described above in conjunction with FIG. 4, a large change in load current also can occur when one of the current-sharing switches is opened or closed. In FIG. 4 at time $t_1$, current $I_4$ changed from a +250 amps to a −150 amps. But that change in current does not cause the voltage on the output terminals to go out of the regulation band; nor does it generate RFI radiation. This is because the speed with which the current change occurs is limited to the reaction time of the current-sharing circuitry of the power supplies. Typically, the total change in current would occur over 10 to 50 milliseconds. By comparison, when one of the variable resistors $20a$, $20b$, or $20c$ is opened, the current through that resistor drops to zero instantaneously.

Note also that certain other problems will occur if the current-sharing switch of a set of supplies is not opened before the variable resistor for that set of supplies is opened, and vice versa. Suppose, for example, that in FIG. 3, the variable resistor $20a$ is opened while the current-sharing switches $30a$, $30b$, and $30c$ are closed. When that occurs, all of the supplies will continue to try to share in furnishing the total load current, but such sharing will be impossible since resistor $20a$ is open. In their effort to share the load current, the power supplies of SET1 will increase their output terminal voltage and the power supplies of SET2 and SET3 will decrease their output terminal voltage. And this will continue until the terminal output voltages of all the supplies go out of regulation. Conversely, the power supply system of FIG. 3 will work, although in an unevenly stressed fashion, if the current-sharing switches $30a$, $30b$, and $30c$ always remain open. In fact, the current-sharing between the supplies of each set can be disabled, and the system will still work.

Note further that in order to maintain its preset output voltage, power supplies sense their actual output voltage and adjust it up or down until it equals the preset value. But that sensing can occur at the power supply output terminal, or at the load. So preferably, the terminals of the variable resistors $20a$, $20b$, and $20c$ which interconnect the power supply sets are placed at the points where the power supply sets sense their output voltage. Otherwise, the voltage across a variable resistor could exceed $2\Delta V$, and that in turn would increase the instantaneous change in current which occurs through that component when its step in conductance $\Delta C$ occurs.

In view, therefore, of all of the above, it is to be understood that the invention is not limited to the details of the illustrated embodiments, but is defined by the appended claims.

What is claimed is:

1. A power supply system which is comprised of: multiple sets of power supplies; each set of power supplies having (a) an output terminal for furnishing load current at a certain voltage, (b) a respective load connected to said output terminal, and (c) a respective current-sharing circuit; wherein a switching means is provided which selectively interconnects, and disconnects, the respective current-sharing circuits of said sets such that said power supplies of all connected sets furnish equalized load currents; and variable resistors are provided which selectively interconnect the respective output terminals of said sets to each other through a conductance that increases from zero mhos by a predetermined small step and thereafter progressively increases to a short circuit, and which selectively disconnects the respective output terminals from each other through an oppositely varying conductance.

2. A power supply system according to claim 1 wherein said predetermined small step in conductance is limited to that which produces a voltage sag or spike at said loads which is less than 3% of said certain voltage.

3. A power supply system according to claim 2 wherein each of said variable resistors includes first and second members with respective surfaces that slideably engage in selectable amounts, with the degree of said conductance increasing with the amount of engagement.

4. A power supply system according to claim 3 wherein said first member includes an elongated passageway, and said second member includes an elongated portion which slides into said passageway and engages its surface in selectable amounts to vary said conductance.

5. A power supply system according to claim 4 wherein said elongated portion has a beveled tip which minimizes the amount of initial engagement with said passageway.

6. A power supply system according to claim 5 wherein each respective load is a backplane in a computer system.

7. A power supply system according to claim 1 wherein said predetermined small step in conductance is limited to that which produces a current step of less than 20% of the respective current-furnishing capacity of each set of supplies.

8. A power supply system according to claim 1 wherein said predetermined small step in conductance is limited to one thousand mhos.

9. A power supply system according to claim 1 wherein each of said variable resistors includes first and second members with respective surfaces that slideably engage in selectable amounts, with the degree of said conductance increasing with the amount of engagement.

10. A power supply system according to claim 1 wherein each set of power supplies maintains said certain voltage by sensing the voltage at a node between its output terminal and its load, and wherein said variable conductances of said variable resistors are connected at such nodes.

11. A power supply system which is comprised of: multiple sets of power supplies; each set having an output terminal for furnishing load current at a certain voltage; and a respective load connected to the output terminal of each set; wherein a variable resistor means is provided which selectively interconnects the respective output terminals of said sets to each other; said variable resistor means including a means for varying the conductance between any two of said output terminals such that the conductance increases from zero mhos by a predetermined small step and thereafter gets progressively larger, and vice versa.

12. A power supply system according to claim 11 wherein said predetermined small stop in conductance is limited to that which produces a voltage sag or spike which is less than 3% of said certain voltage.

13. A power supply system according to claim 11 wherein said variable resistor means includes first and second members with respective surfaces that slideably engage in selectable amounts, with the degree of said conductance increasing with the amount of engagement.

14. A power supply system according to claim 13 wherein said first member includes an elongated passageway, and said second member includes an elongated portion which slides into said passageway and engages its surface in selectable amounts to vary said conductance.

15. A power supply system according to claim 14 wherein said elongated portion has a beveled tip which minimizes the amount of initial engagement with said passageway.

* * * * *